(12) United States Patent
Fang (10) Patent No.: US 10,756,634 B2
(45) Date of Patent: *Aug. 25, 2020

(54) SYSTEMS AND METHODS FOR PROTECTING POWER CONVERSION SYSTEMS UNDER OPEN AND/OR SHORT CIRCUIT CONDITIONS

(71) Applicant: ON-BRIGHT ELECTRONICS (SHANGHAI) CO., LTD., Shanghai (CN)

(72) Inventor: Lieyi Fang, Shanghai (CN)

(73) Assignee: On-Bright Electronics (Shanghai) Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 16/256,232

(22) Filed: Jan. 24, 2019

(65) Prior Publication Data

US 2019/0326819 A1    Oct. 24, 2019

Related U.S. Application Data

(60) Continuation of application No. 15/385,685, filed on Dec. 20, 2016, now Pat. No. 10,236,778, which is a
(Continued)

(30) Foreign Application Priority Data

Nov. 8, 2011    (CN) .......................... 2011 1 0362317

(51) Int. Cl.
*H02M 3/335*    (2006.01)
*H02H 7/122*    (2006.01)
(Continued)

(52) U.S. Cl.
CPC ...... *H02M 3/33507* (2013.01); *H02H 7/1213* (2013.01); *H02H 7/1222* (2013.01);
(Continued)

(58) Field of Classification Search
CPC ......... H02M 3/33507; H02M 3/33515; H02M 3/33523
(Continued)

(56) References Cited

U.S. PATENT DOCUMENTS 5,991,172 A    11/1999  Jovanovic et al.
7,593,245 B2    9/2009  Djenguerian et al.
(Continued)

FOREIGN PATENT DOCUMENTS

CN    101202510 A    6/2008
CN    101969188 A    2/2011
(Continued)

OTHER PUBLICATIONS

Chinese Patent Office, Office Action dated Nov. 5, 2013, in Application No. 201110362317.6.
(Continued)

*Primary Examiner* — Nguyen Tran
(74) *Attorney, Agent, or Firm* — Faegre Drinker Biddle & Reath LLP (57) ABSTRACT

System and method are provided for protecting a power converter. The system includes a first comparator, and an off-time component. The first comparator is configured to receive a sensing signal and a first threshold signal and generate a first comparison signal based on at least information associated with the sensing signal and the first threshold signal, the power converter being associated with a switching frequency and further including a switch configured to affect the primary current. The off-time component is configured to receive the first comparison signal and generate an off-time signal based on at least information associated with the first comparison signal. The off-time component is further configured to, if the first comparison signal indicates the sensing signal to be larger than the first
(Continued)

threshold signal in magnitude, generate the off-time signal to keep the switch to be turned off for at least a predetermined period of time.

6 Claims, 8 Drawing Sheets

Related U.S. Application Data division of application No. 14/154,973, filed on Jan. 14, 2014, now Pat. No. 9,583,935, which is a division of application No. 13/323,491, filed on Dec. 12, 2011, now Pat. No. 8,811,042.

(51) Int. Cl.
| | | |
|---|---|---|
| *H02M 1/32* | (2007.01) | |
| *H02H 7/12* | (2006.01) | |
| *H02M 1/08* | (2006.01) | |
| *H02H 3/06* | (2006.01) | |

(52) U.S. Cl.
CPC ............... *H02M 1/08* (2013.01); *H02M 1/32* (2013.01); *H02M 3/33523* (2013.01); *H02H 3/06* (2013.01)

(58) Field of Classification Search
USPC ............. 363/21.12, 21.13, 21.15–21.18
See application file for complete search history.

(56) References Cited

U.S. PATENT DOCUMENTS

| | | | |
|---|---|---|---|
| 8,149,600 B2 | 4/2012 | Teo | |
| 8,451,635 B2 | 5/2013 | Murata | |
| 8,811,042 B2 | 8/2014 | Fang | |
| 9,240,727 B2 | 1/2016 | Sugawara et al. | |
| 9,570,903 B2 | 2/2017 | Fang | |
| 9,583,935 B2 | 2/2017 | Fang | |
| 10,116,220 B2 | 10/2018 | Fang | |
| 10,236,778 B2 | 3/2019 | Fang | |
| 2005/0207189 A1 | 9/2005 | Chen | |
| 2006/0055433 A1 | 3/2006 | Yang et al. | |
| 2008/0031017 A1 | 2/2008 | Ng et al. | |
| 2009/0174978 A1 | 7/2009 | Nakamura | |
| 2011/0002068 A1* | 1/2011 | Hu | H02M 1/32 361/18 |
| 2011/0299304 A1 | 12/2011 | Coley et al. | |
| 2012/0008346 A1 | 1/2012 | Kawamura | |
| 2012/0230065 A1 | 9/2012 | Choi et al. | |
| 2014/0126248 A1 | 5/2014 | Fang | |
| 2014/0313791 A1 | 10/2014 | Fang | |
| 2017/0170716 A1 | 6/2017 | Fang | |
| 2017/0170717 A1 | 6/2017 | Fang | |

FOREIGN PATENT DOCUMENTS

| | | |
|---|---|---|
| CN | 102064703 A | 5/2011 |
| CN | 101599701 B | 9/2011 |
| TW | I 448029 | 8/2014 |

OTHER PUBLICATIONS

Taiwan Patent Office, Office Action dated Dec. 9, 2013, in Application No. 10221695560.

United States Patent and Trademark Office, Office Action dated Nov. 15, 2017, in U.S. Appl. No. 15/385,685.

United States Patent and Trademark Office, Office Action dated Jul. 25, 2018, in U.S. Appl. No. 15/385,685.

United States Patent and Trademark Office, Notice of Allowance dated Oct. 29, 2018, in U.S. Appl. No. 15/385,685.

\* cited by examiner

SYSTEMS AND METHODS FOR PROTECTING POWER CONVERSION SYSTEMS UNDER OPEN AND/OR SHORT CIRCUIT CONDITIONS

1. CROSS-REFERENCES TO RELATED APPLICATIONS

This application is a continuation of U.S. patent application Ser. No. 15/385,685, filed Dec. 20, 2016, which is a divisional of U.S. patent application Ser. No. 14/154,973, filed Jan. 14, 2014, which is a divisional of U.S. patent application Ser. No. 13/323,491, filed Dec. 12, 2011, which claims priority to Chinese Patent Application No. 201110362317.6, filed Nov. 8, 2011, all of the above-referenced applications being commonly assigned and incorporated by reference herein for all purposes.

2. BACKGROUND OF THE INVENTION

The present invention is directed to integrated circuits. More particularly, the invention provides systems and methods for protecting a power conversion system. Merely by way of example, the invention has been applied to protecting a power conversion system with pulse-width modulation. But it would be recognized that the invention has a much broader range of applicability.

Pulse-width-modulation (PWM) technology is widely used in power conversion systems. Various protection mechanisms, such as over-voltage protection, over-temperature protection, current-limiting or over-current protection (OCP), and over-power protection (OPP), are often built in circuitry associated with a PWM controller to protect a power conversion system in which the PWM controller is used from potential damages. The protection mechanisms usually work when the circuitry associated with the PWM controller operates in normal conditions. But when the circuitry associated with the PWM controller is under certain conditions, the protection mechanisms often cannot function properly.

Figure 1:
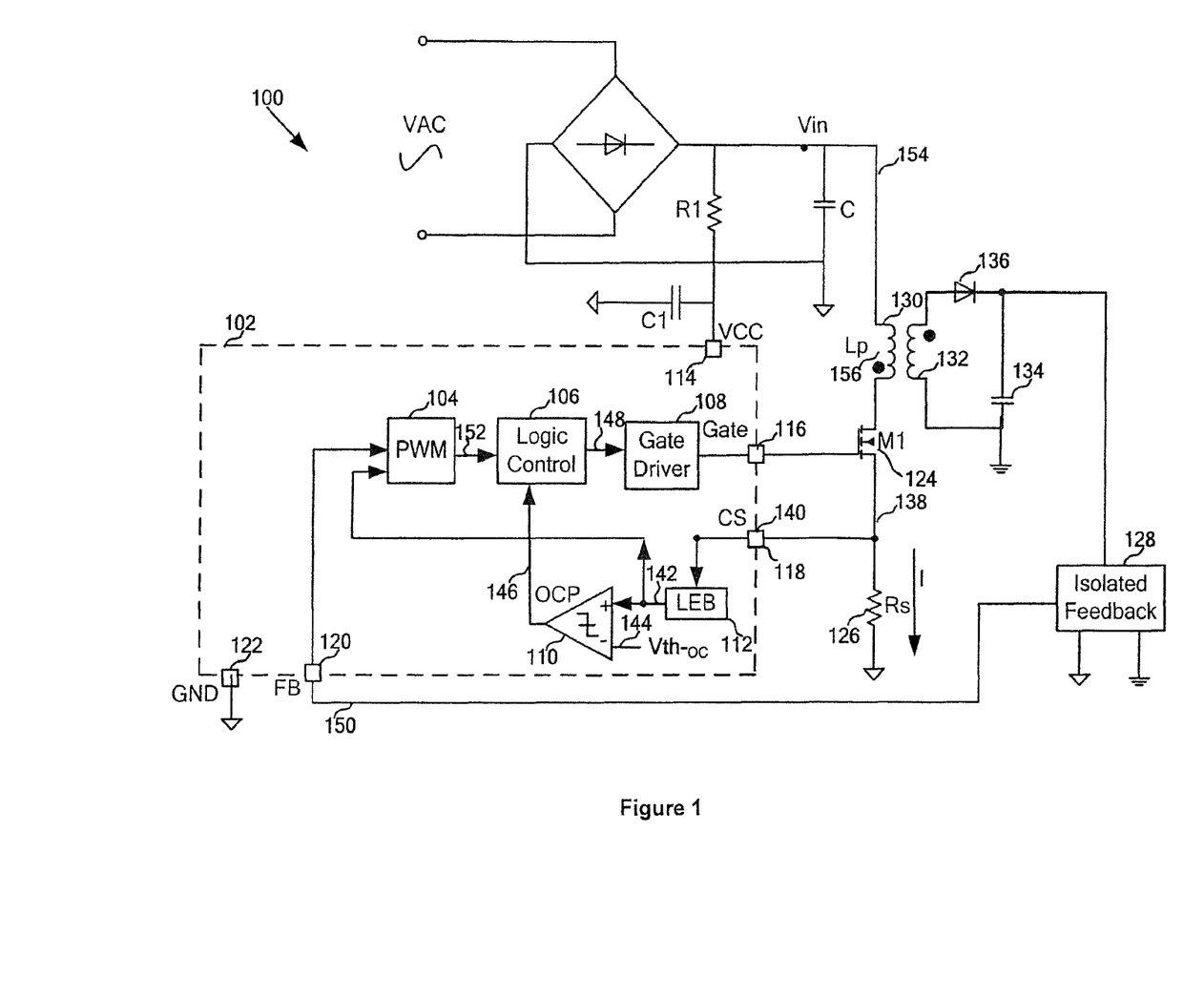
FIG. 1 is a simplified diagram showing a conventional power conversion system including a pulse-width-modulation (PWM) controller.

FIG. 1 is a simplified diagram showing a conventional power conversion system including a pulse-width-modulation (PWM) controller. The power conversion system 100 includes a PWM controller 102, a power switch 124, a current-sensing resistor 126, an isolated feedback component 128, a primary winding 130, a secondary winding 132, a capacitor 134, and a rectifying diode 136. The PWM controller 102 includes a PWM component 104, a logic-control component 106, a gate driver 108, a comparator 110, and a leading-edge-blanking (LEB) component 112. Further, the PWM controller 102 includes five terminals 114, 116, 118, 120, and 122. For example, the power switch 124 is a transistor.

In operation, a primary current 138 flows through the primary winding 130, the power switch 124, and the current-sensing resistor 126 (e.g., $R_s$). In response, a resistor signal 140 (e.g., $V_{CS}$) is output to the terminal 118 (e.g., terminal CS). The LEB component 112 receives the signal 140, and outputs a current-sensing signal 142 to a non-inverting input terminal of the comparator 110. For example, the current-sensing signal 142 is the resistor signal 140 processed by the LEB component 112. In another example, the LEB component 112 can be removed, and the current-sensing signal 142 is the same as the resistor signal 140.

The comparator 110 receives a threshold signal 144 (e.g., $V_{th\text{-}OC}$) at an inverting input terminal, and generates a comparison signal 146 based on the threshold signal 144 and the current-sensing signal 142. The PWM component 104 receives a feedback signal 150 from the isolated feedback component 128 and the current-sensing signal 142, and in response generates a modulation signal 152. The logic-control component 106 receives the comparison signal 146 and the modulation signal 152, and in response outputs a signal 148 to the gate driver 108 for driving the power switch 124.

Over-current protection is usually needed to limit the primary current 138 in order to protect the power conversion system 100 from various damaging conditions, such as excessive power, thermal run-away, transformer saturation, and excessive current and voltage stress. In normal operation, the primary current 138 is lower than a predetermined current limit (e.g., $I_{Limit}$) in magnitude. The predetermined current limit can be determined according to the following equation.

$$I_{Limit} = \frac{V_{in}}{L_p} \times t_{on} = \frac{V_{th-OC}}{R_s} \qquad \text{(Equation 1)}$$

where $I_{Limit}$ represents the predetermined current limit, $V_{in}$ represents an input voltage 154 on the primary winding 130, and $L_p$ represents an inductance 156 of the primary winding 130. Additionally, $t_{on}$ represents a time period during which the power switch 124 is closed (e.g., on), $V_{th\text{-}OC}$ represents the threshold signal 144, and $R_s$ represents the resistance of the current-sensing resistor 126.

If the primary current 138 becomes greater than the predetermined current limit (e.g., $I_{Limit}$) in magnitude, the current-sensing signal 142 is greater than the threshold signal 144 (e.g., $V_{th\text{-}OC}$) in magnitude. In response, the PWM controller 102 turns off the power switch 124, and shuts down the power conversion system 100. But under certain conditions, the power conversion system 100 often cannot be effectively protected from being damaged or blown out.

Hence it is highly desirable to improve techniques for protecting a power conversion system.

3. BRIEF SUMMARY OF THE INVENTION

The present invention is directed to integrated circuits. More particularly, the invention provides systems and methods for protecting a power conversion system. Merely by way of example, the invention has been applied to protecting a power conversion system with pulse-width modulation. But it would be recognized that the invention has a much broader range of applicability.

According to one embodiment, a system for protecting a power converter includes a first comparator and an off-time component. The first comparator is configured to receive a sensing signal and a first threshold signal and generate a first comparison signal based on at least information associated with the sensing signal and the first threshold signal, the sensing signal being associated with at least a primary current flowing through a primary winding of the power converter, the power converter being associated with a switching frequency and further including a switch configured to affect the primary current. The off-time component is configured to receive the first comparison signal and generate an off-time signal based on at least information associated with the first comparison signal. The off-time component is further configured to, if the first comparison signal indicates the sensing signal to be larger than the first threshold signal in magnitude, generate the off-time signal to keep the switch to be turned off for at least a predetermined period of time, the predetermined period of time extending beyond at least a beginning of a next switching period corresponding to the switching frequency.

According to another embodiment, a system for protecting a power converter includes a first comparator and a detection component. The first comparator is configured to receive a first input signal and a second input signal and generate a first comparison signal based on at least information associated with the first input signal and the second input signal, the first input signal being associated with at least a primary current flowing through a primary winding of the power converter, the power converter further including a switch configured to affect the primary current. The detection component is configured to receive the first comparison signal and generate an off-time signal based on at least information associated with the first comparison signal. Further, the detection component is configured, if the first comparison signal indicates that the first input signal is smaller than the second input signal in magnitude for a first predetermined period of time, to generate the off-time signal to turn off the switch. Moreover, the detection component is configured, if the first comparison signal does not indicate that the first input signal is smaller than the second input signal in magnitude for the first predetermined period of time, not to generate the off-time signal to turn off the switch.

According to yet another embodiment, a system for protecting a power converter includes a first comparator, a timing component, and an off-time component. The first comparator is configured to receive a sensing signal and a first threshold signal and generate a first comparison signal based on at least information associated with the sensing signal and the first threshold signal, the sensing signal being associated with at least a primary current flowing through a primary winding of the power converter, the power converter being associated with a switching frequency and further including a switch configured to affect the primary current. The timing component is configured to receive an input signal and generate a timing signal. The off-time component is configured to receive the timing signal, to detect the first comparison signal at a detection time in response to the timing signal, and to generate an off-time signal based on at least information associated with the first comparison signal if the detection time corresponds to the time when the switch is turned on. The off-time component is further configured to, if the detection time corresponds to the time when the switch is turned on and the detected first comparison signal indicates that the sensing signal to be smaller than the first threshold signal in magnitude, generate the off-time signal to keep the switch to be turned off for at least a predetermined period of time, the predetermined period of time extending beyond at least a beginning of a next switching period corresponding to the switching frequency. For example, the off-time component is further configured, if the detection time corresponds to a time when the switch is turned off, not to generate the off-time signal.

According to yet another embodiment, a method for protecting a power converter includes: receiving a sensing signal and a first threshold signal, processing information associated with the sensing signal and the first threshold signal, and generating a first comparison signal based on at least information associated with the sensing signal and the first threshold signal, the sensing signal being associated with at least a primary current flowing through a primary winding of the power converter, the power converter being associated with a switching frequency and further including a switch configured to affect the primary current. Additionally, the method includes processing information associated with the first comparison signal, and outputting an off-time signal based on at least information associated with the first comparison signal. Furthermore, the process for outputting an off-time signal includes, if the first comparison signal indicates the sensing signal to be larger than the first threshold signal in magnitude, outputting the off-time signal to keep the switch to be turned off for at least a predetermined period of time, the predetermined period of time extending beyond at least a beginning of a next switching period corresponding to the switching frequency.

According to yet another embodiment, a method for protecting a power converter includes receiving a first input signal and a second input signal, processing information associated with the first input signal and the second input signal, and generating a first comparison signal based on at least information associated with the first input signal and the second input signal, the first input signal being associated with at least a primary current flowing through a primary winding of the power converter, the power converter further including a switch configured to affect the primary current. Additionally, the method includes processing information associated with the first comparison signal. Furthermore, the method includes if the first comparison signal indicates that the first input signal is smaller than the second input signal in magnitude for a first predetermined period of time, outputting an off-time signal based on at least information associated with the first comparison signal to turn off the switch, and if the first comparison signal does not indicate that the first input signal is smaller than the second input signal in magnitude for the first predetermined period of time, not outputting the off-time signal.

According to yet another embodiment, a method for protecting a power converter includes receiving a sensing signal and a first threshold signal, processing information associated with the sensing signal and the first threshold signal, and generating a first comparison signal based on at least information associated with the sensing signal and the first threshold signal, the sensing signal being related to at least a primary current flowing through a primary winding of the power converter, the power converter being associated with a switching frequency and further including a switch configured to affect the primary current. Additionally, the method includes receiving an input signal, processing information associated with the input signal, and generating a timing signal based on at least information associated with the input signal. Further, the method includes receiving the timing signal, detecting the first comparison signal at a detection time in response to the timing signal, and processing information associated with the first comparison signal. Moreover, the method includes outputting an off-time signal based on at least information associated with the first comparison signal if the detection time corresponds to the time when the switch is turned on. The process for outputting an off-time signal includes, if the detection time corresponds to the time when the switch is turned on and the detected first comparison signal indicates that the sensing signal to be smaller than the first threshold signal in magnitude, outputting the off-time signal to keep the switch to be turned off for at least a predetermined period of time, the predetermined period of time extending beyond at least a beginning of a next switching period corresponding to the switching frequency. For example, the off-time component is further configured, if the detection time corresponds to a time when the switch is turned off, not to generate the off-time signal.

Depending upon embodiment, one or more benefits may be achieved. These benefits and various additional objects, features and advantages of the present invention can be fully appreciated with reference to the detailed description and accompanying drawings that follow.

5. DETAILED DESCRIPTION OF THE INVENTION

The present invention is directed to integrated circuits. More particularly, the invention provides systems and methods for protecting a power conversion system. Merely by way of example, the invention has been applied to protecting a power conversion system with pulse-width modulation. But it would be recognized that the invention has a much broader range of applicability.

Referring back to FIG. 1, the magnitude of the resistor signal 140 often does not reflect the magnitude of the primary current 130 under certain conditions, such as a short-circuit condition of the sensing resistor 126 and an open-circuit condition or a floating condition of the terminal 122 (e.g., terminal GND). Then, the power conversion system often cannot be protected by the protection mechanism discussed above from damages or being blown out.

In addition, in an output short-circuit condition, the power conversion system 100 often enters into a deep continuous conduction mode (CCM). The switching frequency of the system 100 usually reaches a maximum value, and the LEB time often becomes fixed. The demagnetization time is usually not long enough. The primary current 138 often reaches a high level, which results in transformer saturation and high voltage spikes during the switch-off transition to damage or blow out the system 100. Additional protection mechanisms are needed under certain conditions for protecting the power conversion system.

Figure 2:
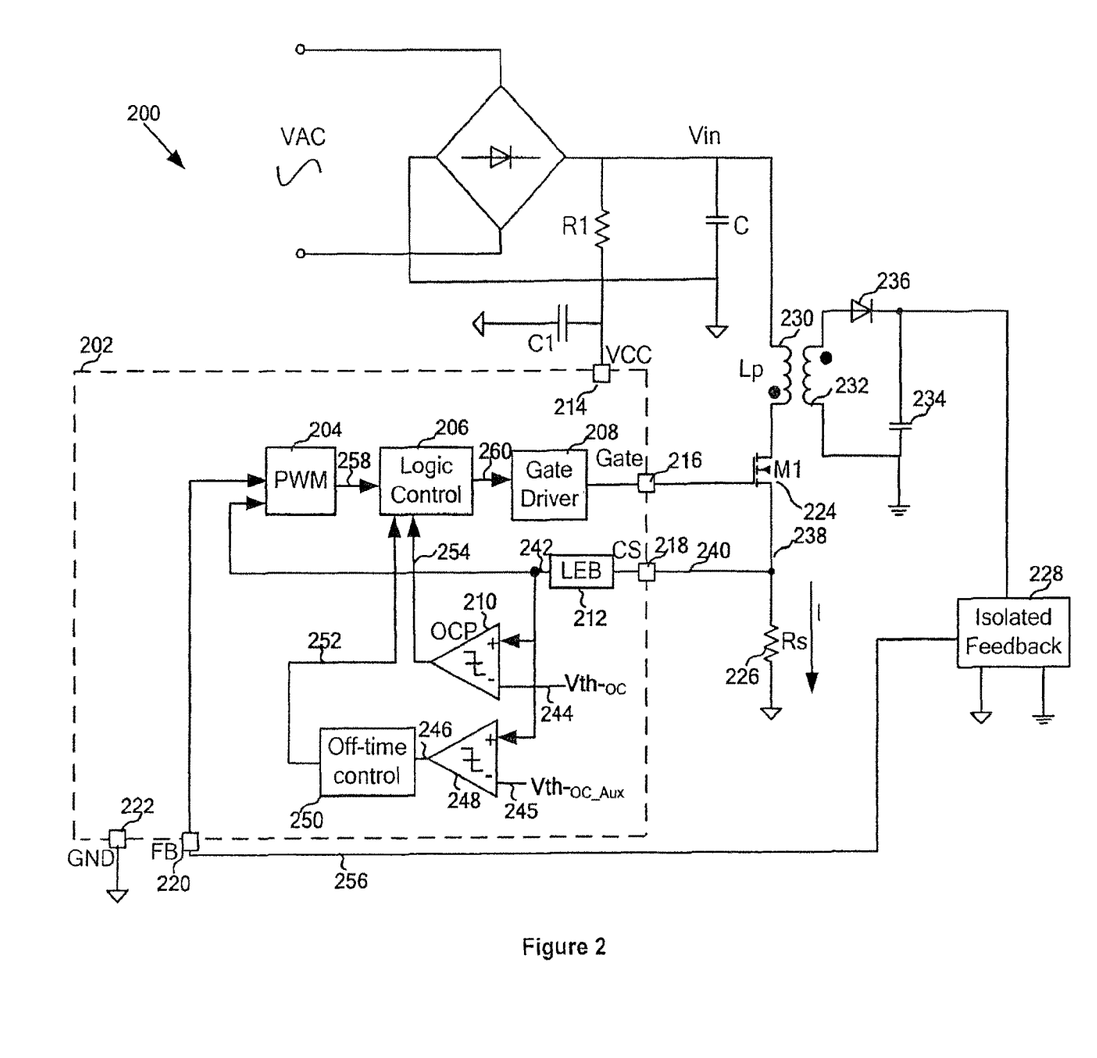
FIG. 2 is a simplified diagram showing a power conversion system including a PWM controller according to an embodiment of the present invention.

FIG. 2 is a simplified diagram showing a power conversion system including a PWM controller according to an embodiment of the present invention. This diagram is merely an example, which should not unduly limit the scope of the claims. One of ordinary skill in the art would recognize many variations, alternatives, and modifications.

The power conversion system 200 includes a PWM controller 202, a power switch 224, a current-sensing resistor 226, an isolated feedback component 228, a primary winding 230, a secondary winding 232, a capacitor 234, and a rectifying diode 236. The PWM controller 202 includes a PWM component 204, a logic-control component 206, a gate driver 208, a comparator 210, a leading edge blanking (LEB) component 212, an auxiliary comparator 248, and an off-time controller 250. Further, the PWM controller 202 includes five terminals 214, 216, 218, 220, and 222.

For example, the power switch 224 is a transistor. In another example, the power switch 224, the current-sensing resistor 226, the isolated feedback component 228, the primary winding 230, the secondary winding 232, the capacitor 234, and the rectifying diode 236 are the same as the power switch 124, the current-sensing resistor 126, the isolated feedback component 128, the primary winding 130, the secondary winding 132, the capacitor 134, and the rectifying diode 136, respectively. In yet another example, the PWM component 204, the logic-control component 206, the gate driver 208, the comparator 210, the LEB component 212, and the terminals 214, 216, 218, 220 and 222 are the same as the PWM component 104, the logic-control component 106, the gate driver 108, the comparator 110, the LEB component 112, and the terminals 114, 116, 118, 120, and 122, respectively.

According to one embodiment, a primary current 238 flows through the primary winding 230, the power switch 224 and the current-sensing resistor 226 (e.g., $R_s$). For example, a resistor signal 240 (e.g., $V_{CS}$) is output to the LEB component 212 through the terminal 218 (e.g., terminal CS). In another example, the LEB component 212 generates, in response, a current-sensing signal 242. In yet another example, the current-sensing signal 242 is the resistor signal 240 processed by the LEB component 212. In yet another example, the LEB component 212 can be removed, and the current-sensing signal 242 is the same as the resistor signal 240. In yet another example, the comparator 210 receives the current-sensing signal 242 at a non-inverting input terminal and a threshold signal 244 (e.g., $V_{th\text{-}OC}$) at an inverting input terminal, and outputs a comparison signal 254 to the logic-control component 206.

According to another embodiment, the auxiliary comparator 248 receives the current-sensing signal 242 at a non-inverting input terminal and an auxiliary threshold signal 245 (e.g., $V_{th\text{-}OC\_aux}$) at an inverting input terminal, and generates an auxiliary comparison signal 246. For example, the off-time controller 250 receives the auxiliary comparison signal 246 and outputs an off-time signal 252 to the logic-control component 206. In another example, the PWM component 204 receives a feedback signal 256 from the isolated feedback component 228 and the current-sensing signal 242, and in response outputs a modulation signal 258 to the logic-control component 206. In yet another example, the logic-control component 206 outputs a signal 260, based on the comparison signal 254, the off-time signal 252 and the modulation signal 258, to the gate driver 208 for driving the power switch 224. In yet another example, the auxiliary threshold signal 245 is greater than the threshold signal 244 in magnitude. In yet another example, the auxiliary threshold signal 245 is 20% larger than the threshold signal 244 in magnitude. In yet another example, the auxiliary threshold signal 245 is 50% larger than the threshold signal 244 in magnitude.

According to yet another embodiment, in normal operation, the primary current 238 is lower than a predetermined level in magnitude. For example, the current-sensing signal 242 is less than the auxiliary threshold signal 245 in magnitude. In another example, the auxiliary comparison signal 246 is at a logic low level, and the off-time controller 250 does not activate a long off-time period $T_1$. In yet another example, the PWM controller 202 turns on and off the power switch 224 normally. In yet another example, the system 200 has a normal switching period corresponding to a normal switching frequency and a normal off-time period (e.g., an off-time $T_0$) which is less than the long off-time period $T_1$.

As shown in FIG. 2, if the output short-circuit condition occurs, the primary current 238 often reaches a high level, and the current-sensing signal 242 generated based on the resistor signal 240 exceeds the auxiliary threshold signal 245 in magnitude according to one embodiment. For example, the auxiliary comparison signal 246 changes from the logic low level to a logic high level. In another example, in response, the off-time controller 250 activates the long off-time period $T_1$. In yet another example, the PWM controller 202 turns off the power switch 224 for at least the long off-time period $T_1$. In yet another example, the long off-time period $T_1$ extends beyond at least a beginning of a next switching period corresponding to a normal switching frequency of the system 200. In yet another example, the long off-time period $T_1$ ends in the next normal switching period. In yet another example, the long off-time period $T_1$ is no less than one normal switching period. In yet another example, the long off-time period $T_1$ is determined by the off-time controller 250.

In another embodiment, after the long off-time period $T_1$, the PWM controller 202 resumes switching on and off the power switch 224 normally. For example, the PWM controller 202 turns off the power switch 224 permanently and the system 200 is shut down. In another example, during the long off-time period $T_1$, the primary current 238 is limited. In yet another example, during the off-time period, output load receives energy and the primary side receives power. In yet another example, the longer the off-time period is, the more energy the output load receives, and the more power the primary side delivers in the switching period that includes the off-time period. In yet another example, the longer the off-time period is, the less the magnitude of the primary current is when the power switch is turned on again.

Figure 3:
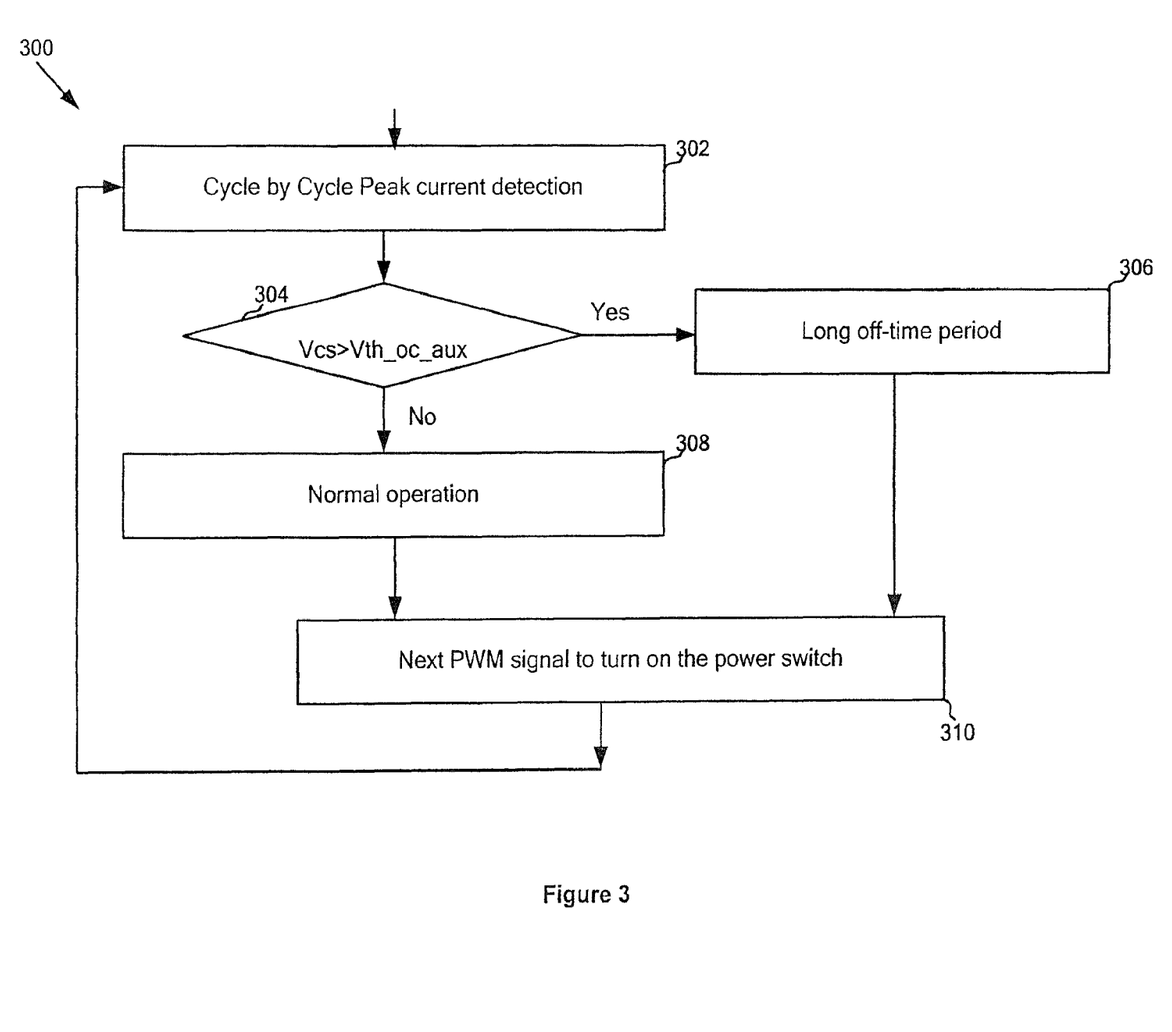
FIG. 3 is a simplified diagram showing a method for protecting the power conversion system shown in FIG. 2 according to one embodiment of the present invention.

FIG. 3 is a simplified diagram showing a method for protecting the power conversion system 200 according to one embodiment of the present invention. This diagram is merely an example, which should not unduly limit the scope of the claims. One of ordinary skill in the art would recognize many variations, alternatives, and modifications.

The method 300 for protecting the power conversion system 200 includes at least a process 302 for detecting the peak current (e.g., the peak value of the current 238) cycle by cycle, a process 304 for comparing the current-sensing signal 242 (e.g., $V_{CS}$) with the auxiliary threshold signal 245 (e.g., $V_{th\text{-}OC\_aux}$), a process 306 for activating the long off-time period $T_1$, a process 308 for performing normal operations with the normal off-time period (e.g., the off-time $T_0$), and a process for turning on the power switch 224 again using a next PWM signal.

According to one embodiment, the current 238 is detected cycle by cycle at the process 302. For example, the current-sensing signal 242 (e.g., $V_{CS}$) is compared with the auxiliary threshold signal 245 (e.g., $V_{th\text{-}OC\_aux}$) at the process 304. In another example, if the current-sensing signal 242 (e.g., $V_{CS}$) is larger than the auxiliary threshold signal 245 (e.g., $V_{th\text{-}OC\_aux}$) in magnitude, the long off-time period $T_1$ is activated at the process 306. In yet another example, the power switch 224 is turned off for at least the long off-time period $T_1$. In yet another example, the power switch 224 is turned off permanently and the system 200 is shut down if the current-sensing signal 242 is larger than the auxiliary threshold signal 245 in magnitude. In yet another example, at the process 308, if the current-sensing signal 242 (e.g., $V_{CS}$) is no larger than the auxiliary threshold signal 245 (e.g., $V_{th\text{-}OC\_aux}$) in magnitude, the long off-time period $T_1$ is not activated, and the system 200 operates with the normal off-time period (e.g., the off-time $T_0$) which is less than the long off-time period $T_1$. In yet another example, the power switch 224 is turned on again by a next PWM signal at the process 310.

Figure 4:
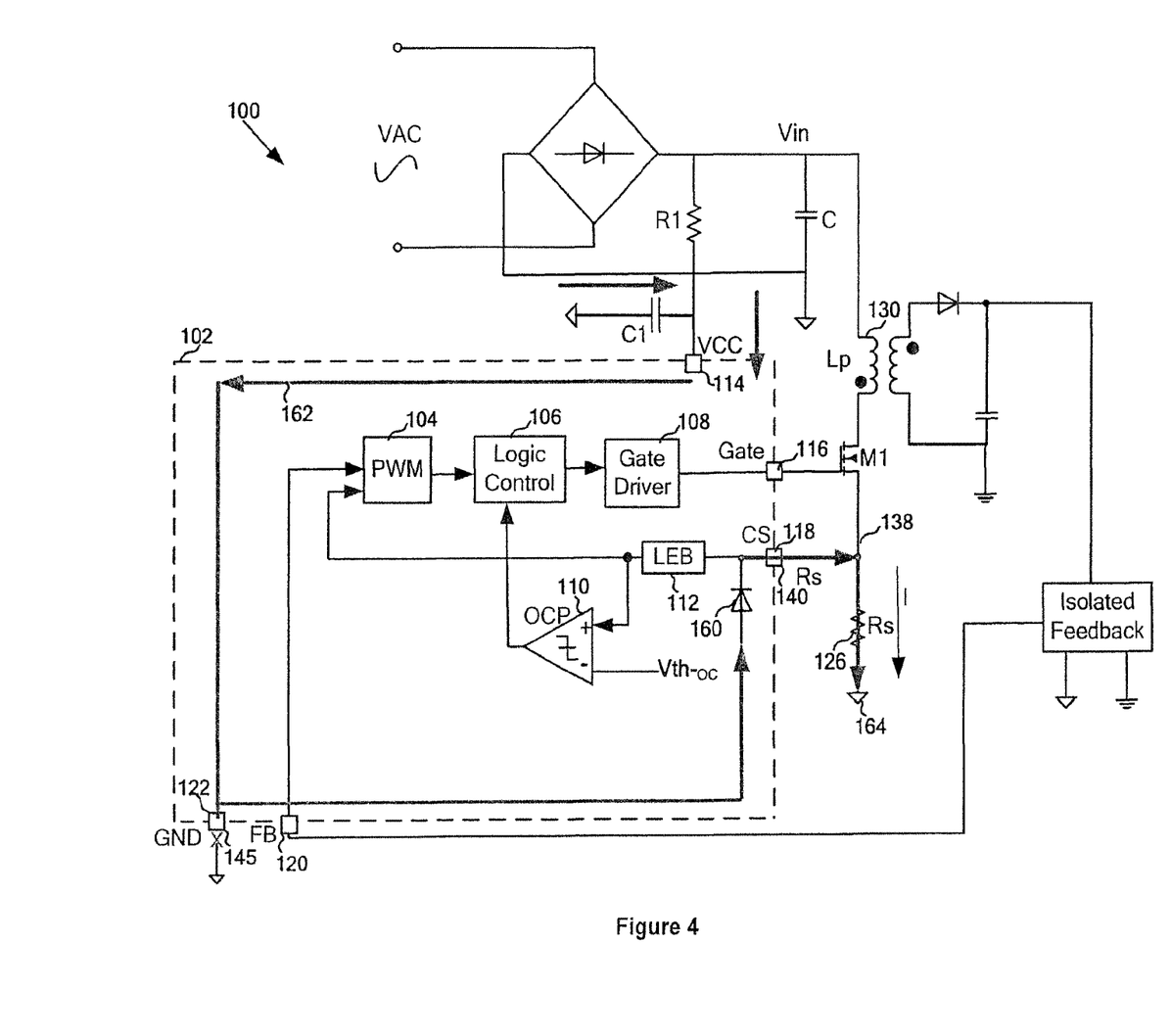
FIG. 4 is a simplified diagram showing the power conversion system shown in FIG. 1 that includes a chip-ground terminal in the open-circuit condition or the floating condition.

FIG. 4 is a simplified diagram showing the power conversion system 100 that includes the terminal 122 in the open-circuit condition or the floating condition. For example, the terminal 122 (e.g., terminal GND) is sometimes under an open-circuit condition or a floating condition. In another example, the resistance of the resistor 126 is often small, and the terminal 118 (e.g., terminal CS) is often a node with a lowest impedance compared to other terminals on the PWM controller 102. In yet another example, a chip-supply current 162 flows into the PWM controller 102 via the terminal 114 (e.g., terminal VCC). In yet another example, the current 162 flows past the terminal 122 (e.g., terminal GND) that is under the open-circuit condition or the floating condition. In yet another example, through an electrostatic discharge (ESD) diode 160, the current 162 flows out of the PWM controller 102 via the terminal 118 (e.g., terminal CS). In yet another example, the current 162 flows, through the resistor 126, to the system ground 164. In yet another example, the resistor signal 140 (e.g., the voltage at the terminal 118) is lower than the chip-ground voltage 145 (e.g., the voltage at the terminal 122) by approximately a predetermined voltage $V_d$ (e.g., a forward voltage drop of the ESD diode 160). Hence, the resistor signal 140 does not reflect a primary current 138 that flows through the primary winding 130 according to certain examples.

Thus, additional protection mechanisms are often needed when the terminal 122 (e.g., terminal GND) is under the open-circuit condition or the floating condition for protecting the power conversions system from damaging conditions, such as over power, transformer saturation, thermal run-away or being blown out.

Figure 5:
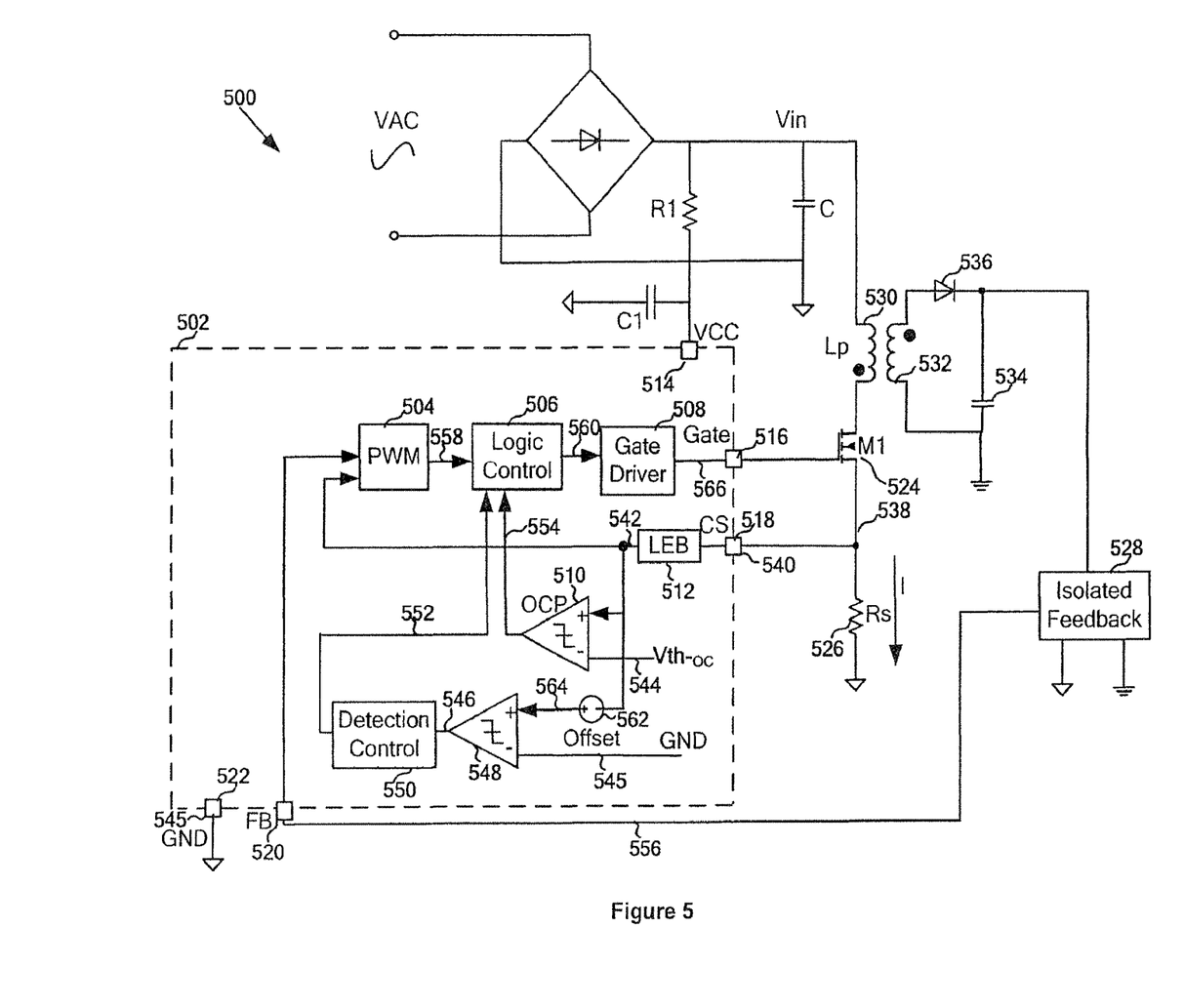
FIG. 5 is a simplified diagram showing a power conversion system including a PWM controller according to another embodiment of the present invention.

FIG. 5 is a simplified diagram showing a power conversion system including a PWM controller according to another embodiment of the present invention. This diagram is merely an example, which should not unduly limit the scope of the claims. One of ordinary skill in the art would recognize many variations, alternatives, and modifications.

The power conversion system 500 includes a PWM controller 502, a power switch 524, a current-sensing resistor 526, an isolated feedback component 528, a primary winding 530, a secondary winding 532, a capacitor 534, and a rectifying diode 536. The PWM controller 502 includes a PWM component 504, a logic-control component 506, a gate driver 508, a comparator 510, a leading edge blanking (LEB) component 512, an auxiliary comparator 548, a detection controller 550, and an offset component 562. Further, the PWM controller 502 includes five terminals 514, 516, 518, 520, and 522.

For example, the power switch 524 is a transistor. In another example, the power switch 524, the current-sensing resistor 526, the isolated feedback component 528, the primary winding 530, the secondary winding 532, the capacitor 534, and the rectifying diode 536 are the same as the power switch 124, the current-sensing resistor 126, the isolated feedback component 128, the primary winding 130, the secondary winding 132, the capacitor 134, and the rectifying diode 136, respectively. In yet another example, the PWM component 504, the logic-control component 506, the gate driver 508, the comparator 510, the LEB component 512, and the terminals 514, 516, 518, 520 and 522 are the same as the PWM component 104, the logic-control component 106, the gate driver 108, the comparator 110, the LEB component 112, and the terminals 114, 116, 118, 120 and 122, respectively.

According to one embodiment, a primary current 538 flows through the primary winding 530, the power switch 524 and the current-sensing resistor 526 (e.g., $R_s$). For example, a resistor signal 540 (e.g., $V_{CS}$) is output to the LEB component 512 through the terminal 518 (e.g., terminal CS). In another example, the LEB component 512 generates, in response, a current-sensing signal 542. In yet another example, the current-sensing signal 542 is the resistor signal 540 processed by the LEB component 512. In yet another example, the LEB component 512 can be removed, and the current-sensing signal 542 is the same as the resistor signal 540. In yet another example, the comparator 510 receives the current-sensing signal 542 at a non-inverting input terminal and a threshold signal 544 (e.g., $V_{th\text{-}OC}$) at an inverting input terminal, and outputs a comparison signal 554 to the logic-control component 506.

According to another embodiment, the offset component 562 receives the current-sensing signal 542 and generates a modified signal 564. For example, the auxiliary comparator 548 receives the modified signal 546 at a non-inverting input terminal and a chip-ground voltage 545 (e.g., the voltage of the terminal 522) at an inverting input terminal, and generates an auxiliary comparison signal 546. In another example, the detection controller 550 receives the auxiliary comparison signal 546 and outputs a detection signal 552 to the logic-control component 506.

According to yet another embodiment, the PWM component 504 receives a feedback signal 556 from the isolated feedback component 528 and the current-sensing signal 542, and in response outputs a modulation signal 558 to the logic-control component 506. For example, the logic-control component 506 generates a signal 560 based on the received comparison signal 554, the detection signal 552 and the modulation signal 558. In another example, the gate driver 508 receives the signal 560 and generates a drive signal 566 for driving the power switch 524.

According to yet another embodiment, if the terminal 522 (e.g., terminal GND) is under the open-circuit condition or the floating condition, the resistor signal 540 is lower than the chip-ground voltage 545 (e.g., the voltage at the terminal 522) by approximately a predetermined voltage $V_d$. For example, the predetermined voltage $V_d$ is a forward voltage drop of an ESD diode. In another example, the ESD diode is part of the PWM controller 502. In yet another example, the modified signal 564 is proportional to the sum of the current-sensing signal 542 and an offset voltage $V_O$. In yet another example, the modified signal 564 is equal to the current-sensing signal 542 plus the offset voltage $V_O$. In yet another example, the offset voltage $V_O$ is larger than zero and less than the predetermined voltage $V_d$. In yet another example, the modified signal 564 is lower than the chip-ground voltage 545 if the terminal 522 (e.g., terminal GND) is under the open-circuit condition or the floating condition. In yet another example, the auxiliary comparison signal 546 is at a logic high level if the modified signal 564 is less than the chip-ground voltage 545.

According to yet another embodiment, if the terminal 522 (e.g., terminal GND) is not under the open-circuit condition or the floating condition, the modified signal 564 that is equal to the current-sensing signal 542 (e.g., $V_{CS}$) plus an offset voltage $V_O$ is greater than the chip-ground voltage 545 (e.g., the voltage of the terminal 522). For example, the auxiliary comparison signal 546 is at a logic low level if the modified signal 564 is greater than the chip-ground voltage 545.

As shown in FIG. 5, if the detection controller 550 detects the auxiliary comparison signal 546 to be at the logic low level which indicates that the terminal 522 is not under the open-circuit condition or the floating condition, the detection controller 550 outputs the detection signal 552 in order to keep the PWM controller 502 operating normally according to one embodiment. For example, if the detection controller 550 detects the auxiliary comparison signal 546 changes from the logic low level to the logic high level, the detection controller 550 continues to monitor the auxiliary comparison signal 546 for a predetermined time period $T_2$. In another example, if during the predetermined time period $T_2$, the auxiliary comparison signal 546 maintains at the logic high level, the detection controller 550 outputs the detection signal 552 in order to turn off the power switch 524 for at least a time period $T_3$. In yet another example, after the time period $T_3$, the PWM controller 502 resumes turning on and off the power switch 524 normally. In yet another example, in response to the signal 560, the PWM controller 502 turns off the power switch 524 permanently and the system 500 is shut down. In yet another example, the time period $T_3$ extends beyond at least a beginning of a next switching period corresponding to a switching frequency of the system 500. In yet another example, the time period $T_3$ ends in the next switching period. In yet another example, the time period $T_3$ is no less than one switching period.

In another embodiment, if during the predetermined time period $T_2$, the auxiliary comparison signal 546 changes from the logic high level to the logic low level, the detection controller 550 does not change the detection signal 552 until the auxiliary comparison signal 546 changes to the logic high level again and remains at the logic high level for a time period equal to $T_3$. For example, the predetermined time period $T_2$ is in the range of micro seconds.

Figure 6:
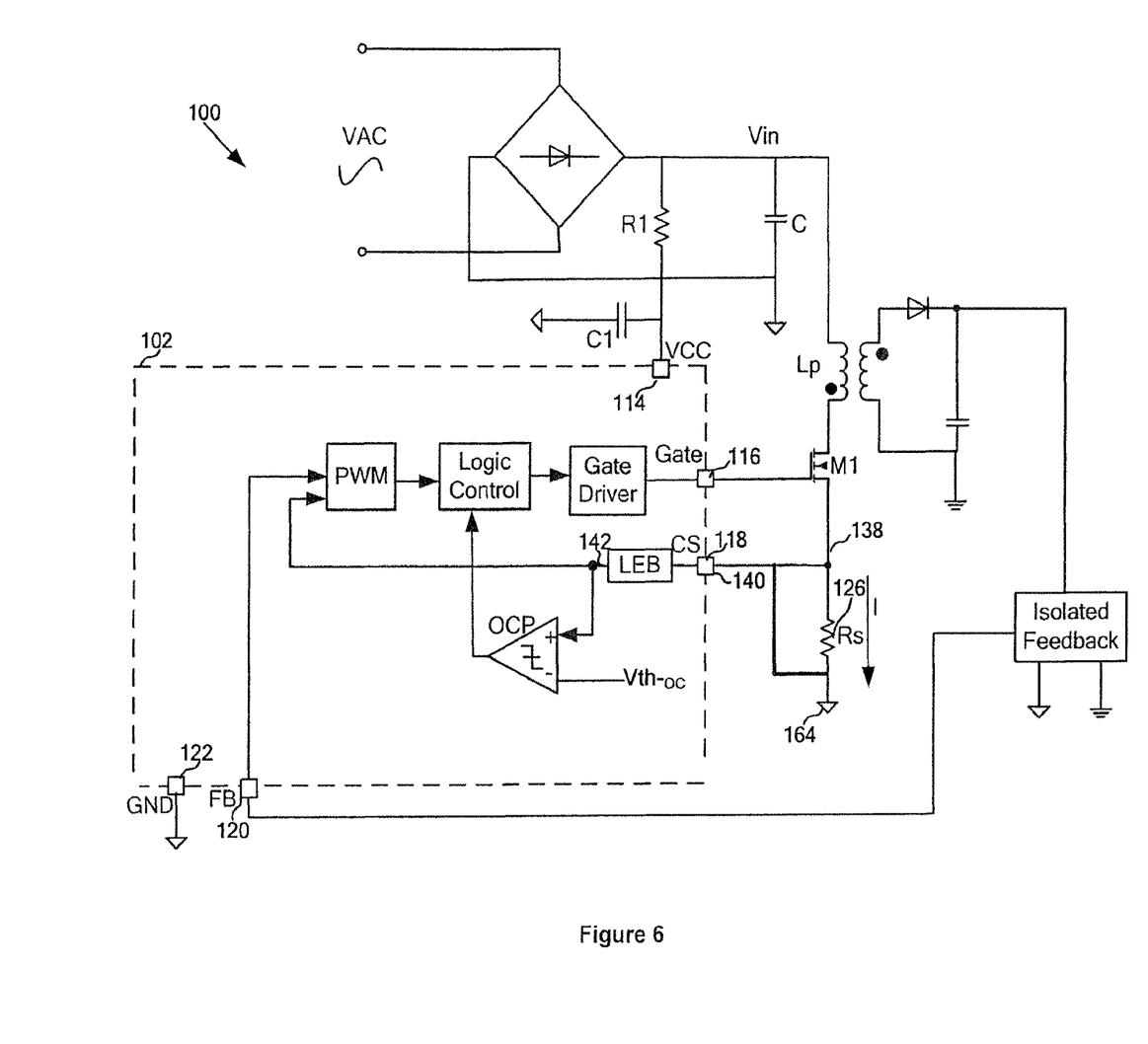
FIG. 6 is a simplified diagram showing the power conversion system shown in FIG. 1 that includes a current-sensing terminal in a short-circuit condition.

FIG. 6 is a simplified diagram showing the power conversion system 100 that includes the terminal 118 in a short-circuit condition. For example, the terminal 118 (e.g., terminal CS) is sometimes under a short-circuit condition (e.g., the resistor 126 is shorted). In another example, a resistor signal 140 (e.g., $V_{CS}$) is approximately equal to the voltage of the system ground 164 (e.g., 0 V). Hence, the resistor signal 140 (e.g., $V_{CS}$) does not reflect a primary current 138 that flows through the primary winding 130 according to certain examples.

Additional protection mechanisms are often needed when the terminal 118 (e.g., terminal CS) is under the short-circuit condition (e.g., the resistor 126 is shorted) for protecting the power conversion system from damaging conditions, such as over power, transformer saturation, thermal run-away or being blown out.

Figure 7:
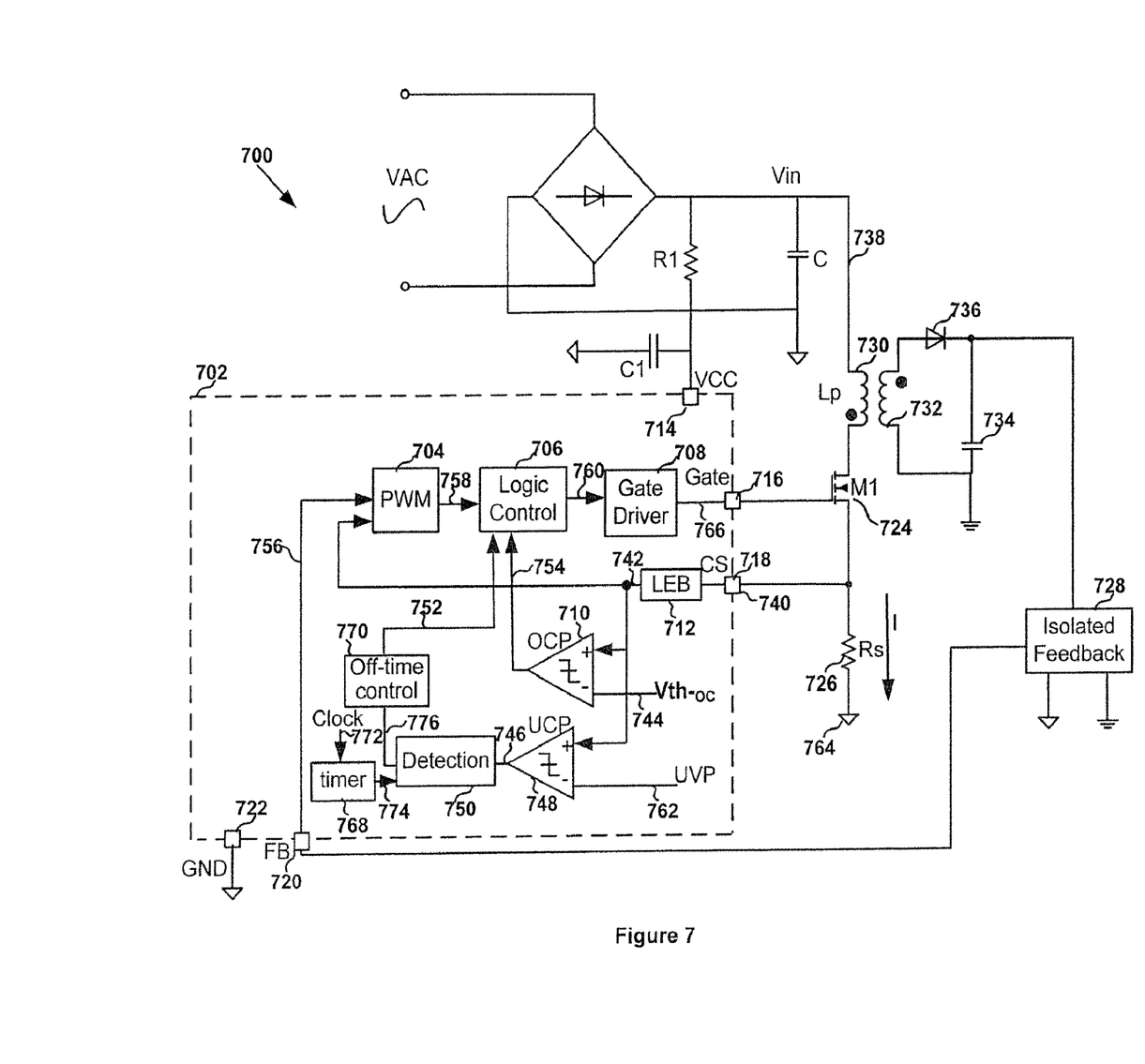
FIG. 7 is a simplified diagram showing a power conversion system including a PWM controller according to another embodiment of the present invention.

FIG. 7 is a simplified diagram showing a power conversion system including a PWM controller according to another embodiment of the present invention. This diagram is merely an example, which should not unduly limit the scope of the claims. One of ordinary skill in the art would recognize many variations, alternatives, and modifications.

The power conversion system 700 includes a PWM controller 702, a power switch 724, a current-sensing resistor 726, an isolated feedback component 728, a primary winding 730, a secondary winding 732, a capacitor 734, and a rectifying diode 736. The PWM controller 702 includes a PWM component 704, a logic-control component 706, a gate driver 708, a comparator 710, a leading edge blanking (LEB) component 712, an auxiliary comparator 748, a detection component 750, a timer 768, and an off-time controller 770. Further, the PWM controller 702 includes five terminals 714, 716, 718, 720, and 722.

For example, the power switch 724 is a transistor. In another example, the power switch 724, the current-sensing resistor 726, the isolated feedback component 728, the primary winding 730, the secondary winding 732, the capacitor 734, and the rectifying diode 736 are the same as the power switch 124, the current-sensing resistor 126, the isolated feedback component 128, the primary winding 130, the secondary winding 132, the capacitor 134, and the rectifying diode 136, respectively. In yet another example, the PWM component 704, the logic-control component 706, the gate driver 708, the comparator 710, the LEB component 712, and the terminals 714, 716, 718, 720 and 722 are the same as the PWM component 104, the logic-control component 106, the gate driver 108, the comparator 110, the LEB component 112, and the terminals 114, 116, 118, 120 and 122, respectively.

According to one embodiment, a primary current 738 flows through the primary winding 730, the power switch 724 and the current-sensing resistor 726 (e.g., $R_s$). For example, a resistor signal 740 (e.g., $V_{CS}$) is output to the LEB component 712 through the terminal 718 (e.g., terminal CS). In another example, the LEB component 712 generates a current-sensing signal 742. In yet another example, the current-sensing signal 742 is the resistor signal 740 processed by the LEB component 712. In yet another example, the LEB component 712 can be removed, and the current-sensing signal 742 is the same as the resistor signal 740. In yet another example, the comparator 710 receives the current-sensing signal 742 at a non-inverting input terminal and a threshold signal 744 (e.g., $V_{th\text{-}OC}$) at an inverting input terminal, and outputs a comparison signal 754 to the logic-control component 706.

According to another embodiment, the auxiliary comparator 748 receives the current-sensing signal 742 at a non-inverting input terminal and an auxiliary threshold signal 762 (e.g., UVP) at an inverting input terminal, and outputs an auxiliary comparison signal 746 to the detection component 750. For example, the timer 768 receives a clock signal 772, and outputs a delay signal 774 to the detection component 750. In another example, in response to the delay signal 774, the detection component 750 detects the auxiliary comparison signal 746 after a predetermined delay from the time when the power switch 724 is turned on.

According to yet another embodiment, the detection component 750 detects the auxiliary comparison signal 746 in a switching period after the power switch 724 is turned on. For example, the switching period includes an on-time period and an off-time period for the power switch 724. In another example, the signal 774 has the same rising edge as the clock signal 772 (e.g., the rising edge of the clock signal 772 representing the beginning of the on-time period for the power switch 724). In yet another example, the detection component 750 detects the auxiliary comparison signal 746 at a falling edge of the signal 774. In yet another example, the falling edge of the signal 774 follows immediately, after the predetermined delay, a rising edge of the signal 774.

As another example, if the detection component 750 detects the auxiliary comparison signal 746 during the off-time period for the power switch 724, the output of the detection component 750 is not active. On the other hand, if the detection component 750 detects the auxiliary comparison signal 746 during the on-time period for the power switch 724, the detection component 750 outputs a detection signal 776 to the off-time controller 770, according to certain embodiments.

In another embodiment, the off-time controller 770 outputs an off-time signal 752 to the logic-control component 706 in response to the detection signal 776. For example, the PWM component 704 receives a feedback signal 756 from the isolated feedback component 728 and the current-sensing signal 742, and in response outputs a modulation signal 758 to the logic-control component 706. In another example, the logic-control component 706 generates a signal 760 based on the comparison signal 754, the off-time signal 752 and the modulation signal 758. In yet another example, the gate driver 708 receives the signal 760 and generates a drive signal 766 for driving the power switch 724.

In one embodiment, if the terminal 718 (e.g., terminal CS) is under the short-circuit condition (e.g., the resistor 726 is shorted), the resistor signal 740 is approximately equal to the voltage of the system ground 764 (e.g., 0 V) in magnitude. For example, if the terminal 718 (e.g., terminal CS) is under a nearly short-circuit condition (e.g., the terminal 718 has a very small impedance), the resistor signal 740 has a small magnitude. In another example, the current-sensing signal 742 is less than the auxiliary threshold signal 762 in magnitude. In yet another example, the auxiliary comparison signal 746 is at a logic low level if the current-sensing signal 742 is lower than the auxiliary threshold signal 762 in magnitude.

In another embodiment, if the terminal 718 (e.g., terminal CS) is not under the short-circuit condition, the resistor signal 740 is greater than the voltage of the system ground 764 (e.g., 0 V) in magnitude after the predetermined delay from the time when the power switch 724 is turned on. For example, the current-sensing signal 742 (e.g., $V_{CS}$) is greater than the auxiliary threshold signal 762 (e.g., UVP) in magnitude after the predetermined delay from the time when the power switch 724 is turned on. In another example, the auxiliary comparison signal 746 is at a logic high level if the current-sensing signal 742 is greater than the auxiliary threshold signal 762 in magnitude.

As shown in FIG. 7, if the detection component 750 detects, after the predetermined delay from the time when the power switch 724 is turned on (e.g., at the falling edge of the signal 774), that the auxiliary comparison signal 746 is at the logic high level, the PWM controller 702 operates normally according to one embodiment. For example, the off-time controller 770 does not activate a long off-time period $T_5$. In another example, the system 700 has a normal switching period corresponding to a normal switching frequency of the system 200 and a normal off-time period (e.g., an off-time $T_4$) which is less than the long off-time period $T_5$.

According to another embodiment, if the detection component 750 detects, after the predetermined delay (e.g., at the falling edge of the signal 774), that the auxiliary comparison signal 746 is at the logic low level, the detection component 750 outputs the detection signal 776 to activate the long off-time period $T_5$. For example, the long off-time period $T_5$ is determined by the off-time controller 770. In another example, the long off-time period $T_5$ is in the range of tens of micro seconds to several milliseconds. In yet another example, the PWM controller 702 turns off the power switch 724 for at least the long off-time period $T_5$. In yet another example, the long off-time period $T_5$ extends beyond at least a beginning of a next switching period corresponding to a normal switching frequency of the system 700. In yet another example, the long off-time period $T_5$ ends in the next normal switching period. In yet another example, the long off-time period $T_5$ is no less than one normal switching period.

In yet another example, after the long off-time period $T_5$, the PWM controller 702 resumes switching on and off the power switch 724 normally. In yet another example, the PWM controller 702 turns off the power switch 724 permanently and the system 700 is shut down. In yet another example, during the long off-time period $T_5$, the primary current 738 is limited. In yet another example, during the long off-time period $T_5$, the switching frequency of the system 700 is reduced. In yet another example, during the long off-time period $T_5$, power delivered to output load is limited.

Figure 8:
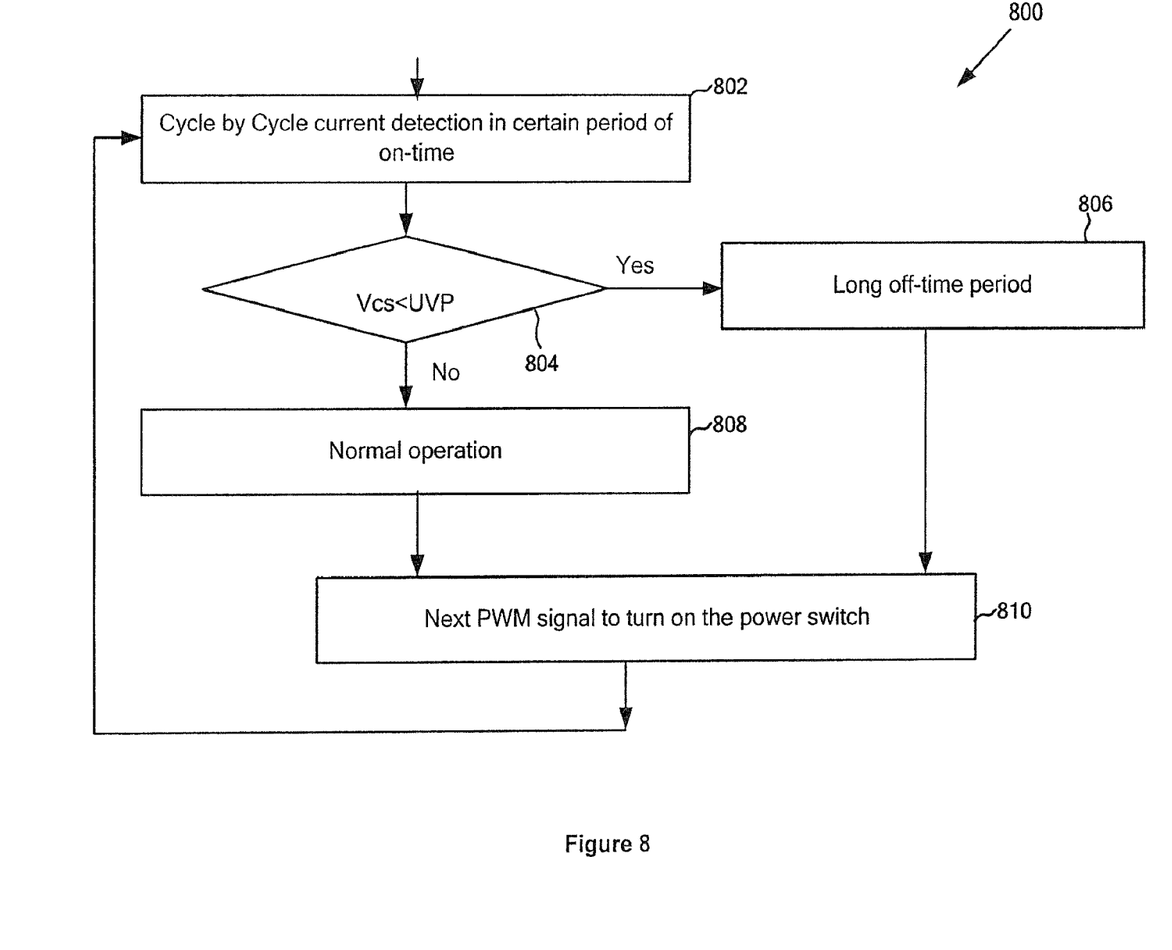
FIG. 8 is a simplified diagram showing a method for protecting the power conversion system shown in FIG. 7 according to another embodiment of the present invention.

FIG. 8 is a simplified diagram showing a method for protecting the power conversion system 700 according to one embodiment of the present invention. This diagram is merely an example, which should not unduly limit the scope of the claims. One of ordinary skill in the art would recognize many variations, alternatives, and modifications.

The method 800 includes at least a process 802 for detecting the peak current (e.g., the peak value of the current 738) cycle by cycle, a process 804 for comparing the current-sensing signal 742 (e.g., $V_{CS}$) with the auxiliary threshold signal 762 (e.g., UVP) after a predetermined delay from the time when the power switch 724 is turned on (e.g., at a falling edge of the signal 774), a process 806 for activating the long off-time period $T_5$, a process 808 for performing normal operations with a normal off-time period (e.g., the off-time $T_4$), and a process for turning on the power switch 724 again using a next PWM signal.

According to one embodiment, the current 738 is detected cycle by cycle at the process 802. For example, the current-sensing signal 742 (e.g., $V_{CS}$) is compared with the auxiliary threshold signal 762 (e.g., UVP) after the delay (e.g., at the falling edge of the signal 774) at the process 804. In another example, if the current-sensing signal 742 (e.g., $V_{CS}$) is less than the auxiliary threshold signal 762 (e.g., UVP) in magnitude after the predetermined delay from the time when the power switch 724 is turned on, the long off-time period $T_5$ is activated at the process 806. In yet another example, the power switch 724 is turned off for at least the long off-time period $T_5$. In yet another example, the power switch 724 is turned off permanently and the system 700 is shut down if the current-sensing signal 742 is less than the auxiliary threshold signal 762 in magnitude after the predetermined delay from the time when the power switch 724 is turned on. In yet another example, at the process 808, if the current-sensing signal 742 (e.g., $V_{CS}$) is not less than the auxiliary threshold signal 762 (e.g., UVP) in magnitude after the predetermined delay from the time when the power switch 724 is turned on, the long off-time period $T_5$ is not activated, and the system 700 operates with the normal off-time period (e.g., the off-time $T_4$) which is less than the long off-time period $T_5$. In yet another example, the power switch 724 is turned on again by a next PWM signal at the process 810.

According to another embodiment, a system for protecting a power converter includes a first comparator and an off-time component. The first comparator is configured to receive a sensing signal and a first threshold signal and generate a first comparison signal based on at least information associated with the sensing signal and the first threshold signal, the sensing signal being associated with at least a primary current flowing through a primary winding of the power converter, the power converter being associated with a switching frequency and further including a switch configured to affect the primary current. The off-time component is configured to receive the first comparison signal and generate an off-time signal based on at least information associated with the first comparison signal. The off-time component is further configured to, if the first comparison signal indicates the sensing signal to be larger than the first threshold signal in magnitude, generate the off-time signal to keep the switch to be turned off for at least a predetermined period of time, the predetermined period of time extending beyond at least a beginning of a next switching period corresponding to the switching frequency. For example, the system is implemented according to at least FIG. 2 and/or FIG. 3.

According to yet another embodiment, a system for protecting a power converter includes a first comparator and a detection component. The first comparator is configured to receive a first input signal and a second input signal and generate a first comparison signal based on at least information associated with the first input signal and the second input signal, the first input signal being associated with at least a primary current flowing through a primary winding of the power converter, the power converter further including a switch configured to affect the primary current. The detection component is configured to receive the first comparison signal and generate an off-time signal based on at least information associated with the first comparison signal. Further, the detection component is configured, if the first comparison signal indicates that the first input signal is smaller than the second input signal in magnitude for a first predetermined period of time, to generate the off-time signal to turn off the switch. Moreover, the detection component is configured, if the first comparison signal does not indicate that the first input signal is smaller than the second input signal in magnitude for the first predetermined period of time, not to generate the off-time signal to turn off the switch. For example, the system is implemented according to at least FIG. 5.

According to yet another embodiment, a system for protecting a power converter includes a first comparator, a timing component, and an off-time component. The first comparator is configured to receive a sensing signal and a first threshold signal and generate a first comparison signal based on at least information associated with the sensing signal and the first threshold signal, the sensing signal being associated with at least a primary current flowing through a primary winding of the power converter, the power converter being associated with a switching frequency and further including a switch configured to affect the primary current. The timing component is configured to receive an input signal and generate a timing signal. The off-time component is configured to receive the timing signal, to detect the first comparison signal at a detection time in response to the tuning signal, and to generate an off-time signal based on at least information associated with the first comparison signal if the detection time corresponds to the time when the switch is turned on. The off-time component is further configured to, if the detection time corresponds to the time when the switch is turned on and the detected first comparison signal indicates that the sensing signal to be smaller than the first threshold signal in magnitude, generate the off-time signal to keep the switch to be turned off for at least a predetermined period of time, the predetermined period of time extending beyond at least a beginning of a next switching period corresponding to the switching frequency. As an example, the off-time component is further configured, if the detection time corresponds to a time when the switch is turned off, not to generate the off-time signal. For example, the system is implemented according to at least FIG. 7 and/or FIG. 8.

In another embodiment, a method for protecting a power converter includes: receiving a sensing signal and a first threshold signal, processing information associated with the sensing signal and the first threshold signal, and generating a first comparison signal based on at least information associated with the sensing signal and the first threshold signal, the sensing signal being associated with at least a primary current flowing through a primary winding of the power converter, the power converter being associated with a switching frequency and further including a switch configured to affect the primary current. Additionally, the method includes processing information associated with the first comparison signal, and outputting an off-time signal based on at least information associated with the first comparison signal. Furthermore, the process for outputting an off-time signal includes, if the first comparison signal indicates the sensing signal to be larger than the first threshold signal in magnitude, outputting the off-time signal to keep the switch to be turned off for at least a predetermined period of time, the predetermined period of time extending beyond at least a beginning of a next switching period corresponding to the switching frequency. For example, the method is implemented according to at least FIG. 2 and/or FIG. 3.

In yet another embodiment, a method for protecting a power converter includes receiving a first input signal and a second input signal, processing information associated with the first input signal and the second input signal, and generating a first comparison signal based on at least information associated with the first input signal and the second input signal, the first input signal being associated with at least a primary current flowing through a primary winding of the power converter, the power converter further including a switch configured to affect the primary current. Additionally, the method includes processing information associated with the first comparison signal. Furthermore, the method includes if the first comparison signal indicates that the first input signal is smaller than the second input signal in magnitude for a first predetermined period of time, outputting an off-time signal based on at least information associated with the first comparison signal to turn off the switch, and if the first comparison signal does not indicate that the first input signal is smaller than the second input signal in magnitude for the first predetermined period of time, not outputting the off-time signal. For example, the method is implemented according to at least FIG. 5.

In yet another embodiment, a method for protecting a power converter includes receiving a sensing signal and a first threshold signal, processing information associated with the sensing signal and the first threshold signal, and generating a first comparison signal based on at least information associated with the sensing signal and the first threshold signal, the sensing signal being related to at least a primary current flowing through a primary winding of the power converter, the power converter being associated with a switching frequency and further including a switch configured to affect the primary current. Additionally, the method includes receiving an input signal, processing information associated with the input signal, and generating a timing signal based on at least information associated with the input signal. Further, the method includes receiving the timing signal, detecting the first comparison signal at a detection time in response to the timing signal, and processing information associated with the first comparison signal. Moreover, the method includes outputting an off-time signal based on at least information associated with the first comparison signal if the detection time corresponds to the time when the switch is turned on. The process for outputting an off-time signal includes, if the detection time corresponds to the time when the switch is turned on and the detected first comparison signal indicates that the sensing signal to be smaller than the first threshold signal in magnitude, outputting the off-time signal to keep the switch to be turned off for at least a predetermined period of time, the predetermined period of time extending beyond at least a beginning of a next switching period corresponding to the switching frequency. As an example, the off-time component is further configured, if the detection time corresponds to a time when the switch is turned off, not to generate the off-time signal. For example, the method is implemented according to at least FIG. 7 and/or FIG. 8.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined. In yet another example, the auxiliary comparator 248, the off-time controller 250, the auxiliary comparator 548, the offset component 562, the detection controller 550, the auxiliary comparator 748, the detection component 750, the timer 768, and the off-time controller 770 can be combined into a PWM controller for protecting a power conversion system.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system for protecting a power converter, the system comprising:
 a detection signal generator configured to receive a first comparison signal and generate a detection signal based at least in part on the first comparison signal;
 wherein the detection signal generator is further configured to:
  in response to the first comparison signal indicating that a first input signal is smaller than a second input signal in magnitude for a first predetermined period of time, generating the detection signal to turn off a switch; and
  in response to the first comparison signal indicating that the first input signal is not smaller than the second input signal in magnitude for the first predetermined period of time, not generating the detection signal;

wherein the first input signal is proportional to a sum of a sensing signal and an offset voltage;

wherein the offset voltage is larger than zero in magnitude and less than a forward voltage drop of an electrostatic discharge diode in magnitude.

2. A system for protecting a power converter, the system comprising:

a detection signal generator configured to receive a first comparison signal and generate a detection signal based at least in part on the first comparison signal;

wherein the detection signal generator is further configured to:

in response to the first comparison signal indicating that a first input signal is smaller than a second input signal in magnitude for a first predetermined period of time, generating the detection signal to turn off a switch; and in response to the first comparison signal indicating that the first input signal is not smaller than the second input signal in magnitude for the first predetermined period of time, not generating the detection signal;

wherein:

the detection signal generator is on a chip;

the chip includes a ground terminal; and the second input signal is equal to a voltage of the ground terminal in magnitude.

3. The system of claim 2 wherein the first input signal is proportional to a sum of a sensing signal and an offset voltage.

4. The system of claim 3, and further comprising:

a comparator configured to receive the sensing signal and a threshold signal and generate a second comparison signal based at least in part on the sensing signal and the threshold signal;

wherein the comparator is further configured to, in response to the sensing signal being larger than the threshold signal in magnitude, generate the second comparison signal to turn off the switch.

5. The system of claim 2 wherein the detection signal generator is further configured to, in response to the first comparison signal indicating that the first input signal is smaller than the second input signal in magnitude for the first predetermined period of time, generate the detection signal to keep the switch turned off for at least a second predetermined period of time.

6. The system of claim 5 wherein the second predetermined period of time extends beyond at least a beginning of a next switching period corresponding to the switching frequency of the power converter.

* * * * *